United States Patent
Urella

(10) Patent No.: US 12,293,461 B2
(45) Date of Patent: May 6, 2025

(54) EDGE ENHANCEMENT WITH TEXTURE OPTIMIZATION

(71) Applicant: STREEM, LLC, Portland, OR (US)

(72) Inventor: Nikilesh Urella, Portland, OR (US)

(73) Assignee: STREEM, LLC, Portland, OR (US)

( * ) Notice: Subject to any disclaimer, the term of this patent is extended or adjusted under 35 U.S.C. 154(b) by 182 days.

(21) Appl. No.: 18/104,549

(22) Filed: Feb. 1, 2023

(65) Prior Publication Data
US 2024/0257461 A1  Aug. 1, 2024

(51) Int. Cl.
| | |
|---|---|
| *G06T 17/20* | (2006.01) |
| *G06T 7/13* | (2017.01) |
| *G06T 7/40* | (2017.01) |
| *G06T 7/60* | (2017.01) |
| *G06V 10/60* | (2022.01) |

(52) U.S. Cl.
CPC ............ *G06T 17/20* (2013.01); *G06T 7/13* (2017.01); *G06T 7/40* (2013.01); *G06T 7/60* (2013.01); *G06V 10/60* (2022.01); *G06T 2207/10024* (2013.01); *G06T 2207/20192* (2013.01)

(58) Field of Classification Search
CPC ........ G06T 17/20; G06T 17/13; G06T 17/40; G06T 17/60; G06T 2207/10024; G06T 2207/20192; G06T 7/12; G06V 10/60
See application file for complete search history.

(56) References Cited

U.S. PATENT DOCUMENTS

| | | | | |
|---|---|---|---|---|
| 2018/0025529 A1* | 1/2018 | Wu | ............... | G01J 3/508 |
| | | | | 345/426 |
| 2020/0372710 A1* | 11/2020 | Wang | ............... | G06T 15/005 |
| 2021/0012568 A1* | 1/2021 | Michielin | ............... | G06T 5/20 |
| 2021/0125413 A1* | 4/2021 | Goorts | ............... | G06T 17/20 |
| 2021/0225074 A1* | 7/2021 | Meilland | ............... | G06T 17/20 |
| 2021/0390789 A1* | 12/2021 | Liu | ............... | G06V 40/161 |

(Continued)

OTHER PUBLICATIONS

Wang, Chao, and Xiaohu Guo. "Efficient Plane-Based Optimization of Geometry and Texture for Indoor RGB-D Reconstruction." Proceedings of the IEEE/CVF Conference on Computer Vision and Pattern Recognition Workshops. 2019.

(Continued)

*Primary Examiner* — Sing-Wai Wu
*Assistant Examiner* — Khoa Vu
(74) *Attorney, Agent, or Firm* — Schwabe Williamson & Wyatt

(57) ABSTRACT

A mesh model of a 3D space is provided with improved accuracy by refining the locations of edges of objects in the space. The mesh model includes vertices which define surfaces of triangles. Triangles are identified which have two vertices in one plane and another, outlier vertex in another, adjacent plane. A line is fitted to the outlier vertices to define an edge of an object, and the outlier vertices are moved to the line, referred to as a mesh-based line. Texture data from images of the space can be used to further refine the edge. In one approach, gradients in grayscale pixels which correspond the vertices of the mesh-based line are used to define a grayscale-based line. The two line definitions can be combined or otherwise used to provide a final definition of the edge. The object can be measured based on the length and position of the edge.

20 Claims, 10 Drawing Sheets

(56) References Cited

U.S. PATENT DOCUMENTS

| | | | |
|---|---|---|---|
| 2022/0108483 A1* | 4/2022 | Graziosi | ................ G06T 17/20 |
| 2023/0196676 A1* | 6/2023 | Lambert | ................ G06T 17/20 |
| | | | 345/423 |

OTHER PUBLICATIONS

Fu, Yanping, et al. "Joint texture and geometry optimization for RGB-D reconstruction." Proceedings of the IEEE/CVF Conference on Computer Vision and Pattern Recognition. 2020.

Von Gioi, Rafael Grompone, et al. "LSD: A line segment detector." Image Processing on Line 2 (2012): 35-55.

Wang, Chao, and Xiaohu Guo. "Plane-based optimization of geometry and texture for RGB-D reconstruction of indoor scenes." 2018 International Conference on 3D Vision (3DV). IEEE, 2018.

* cited by examiner

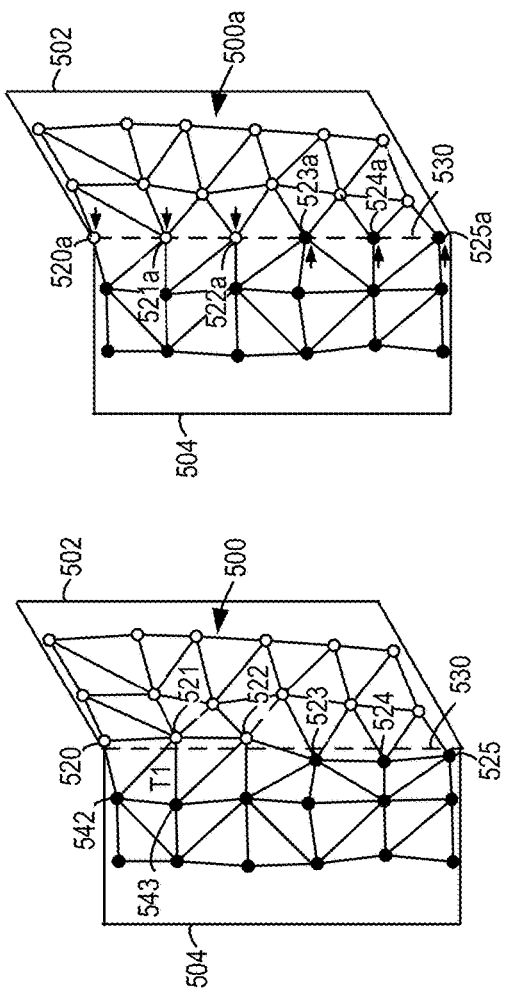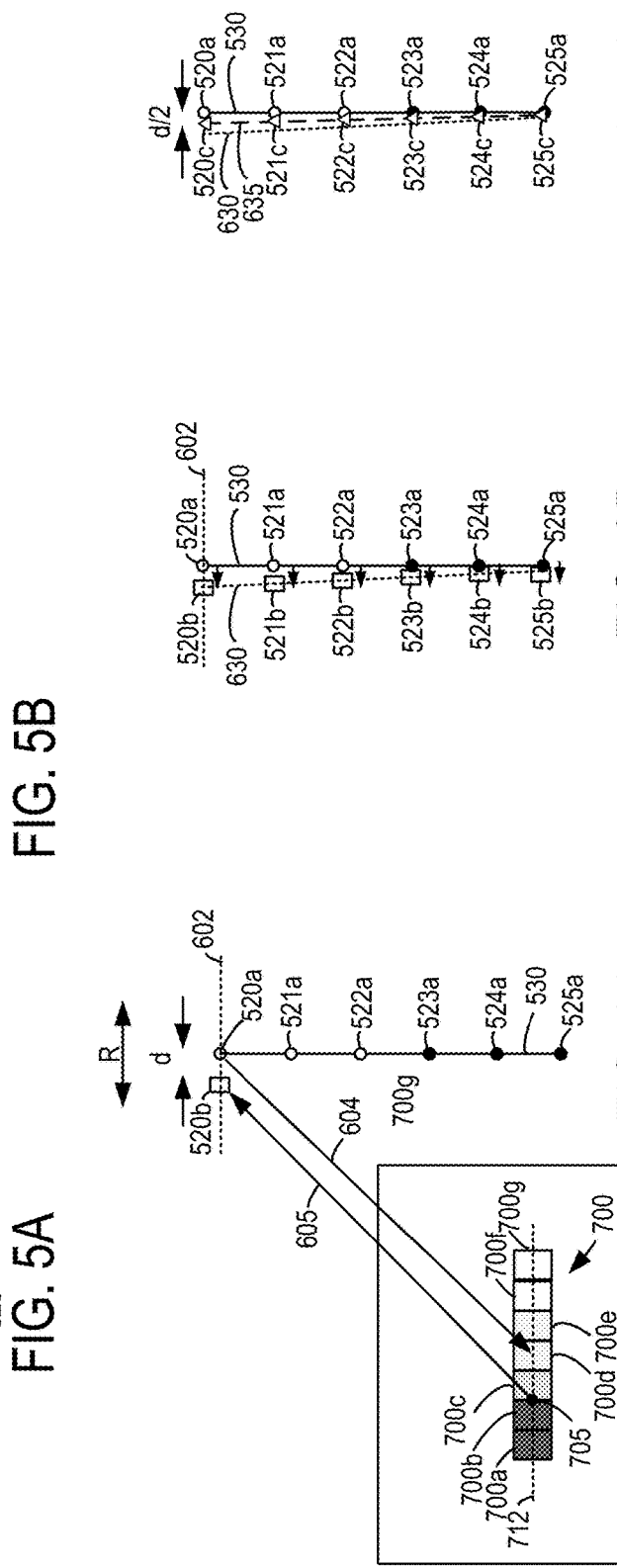

NON-TRANSITORY COMPUTER-READABLE STORAGE MEDIUM
1002

PROGRAMMING INSTRUCTIONS 1004,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 10

EDGE ENHANCEMENT WITH TEXTURE OPTIMIZATION

TECHNICAL FIELD

The present disclosure relates to the field of photogrammetry, and specifically to the generation of a mesh model of a three-dimensional (3D) space from captured images and depth data.

BACKGROUND

Devices such as smartphones and tablets are increasingly capable of measuring and/or computing depth data of images or videos they capture, which in turn are useful for supporting augmented reality (AR) and/or other applications involving 3D spaces. These captured images or video and derived or captured depth data may be processed using various algorithms to detect features in the video, such as planes, surfaces, faces, and other recognizable shapes. These detected features, combined in some implementations with data from depth sensors and/or motion information captured from motion sensors such as a Micro-Electro-Mechanical System (MEMS) gyroscope and accelerometers, can be used by software in creating a point cloud in a 3D space. A 3D mesh representation of the point cloud can in turn be obtained to represent the 3D space more efficiently. The 3D mesh include vertices which represent geometry and boundaries of real objects in the 3D space. The point cloud or 3D mesh enables operations such as measurements of physical dimensions of the real objects.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 5A depicts a mesh model 500 of a portion of the object 404 of FIG. 4, where the mesh model includes vertices on adjacent planes 502 and 504, and a mesh-based line 530 defines an edge of the adjacent planes, consistent with operation 310 of the method of FIG. 3A, according to various embodiments.

FIG. 5B depicts a mesh model 500a obtained from the mesh model 500 of FIG. 5A by moving the vertices 520-525 to the mesh-based line 530 to provide adjusted/moved vertices 520a-525a, respectively, consistent with operation 312 of the method of FIG. 3A, according to various embodiments.

FIG. 6A depicts an example correspondence between a vertex 520a of the mesh model and a set of grayscale pixels, and a correspondence between a location 705 of a peak gradient in the set of pixels to a point 520b in the mesh model, consistent with operations 344 and 346 of the method of FIG. 3B, according to various embodiments.

FIG. 6B depicts an example grayscale-based line 630 which defines an edge between the planes 502 and 504 of FIG. 5A, consistent with operation 346 of the method of FIG. 3B and with FIG. 6A, according to various embodiments.

FIG. 6C depicts an example line 635 which is between the mesh-based line 530 and the grayscale-based line 630 of FIG. 6B, according to various embodiments.

FIG. 10 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
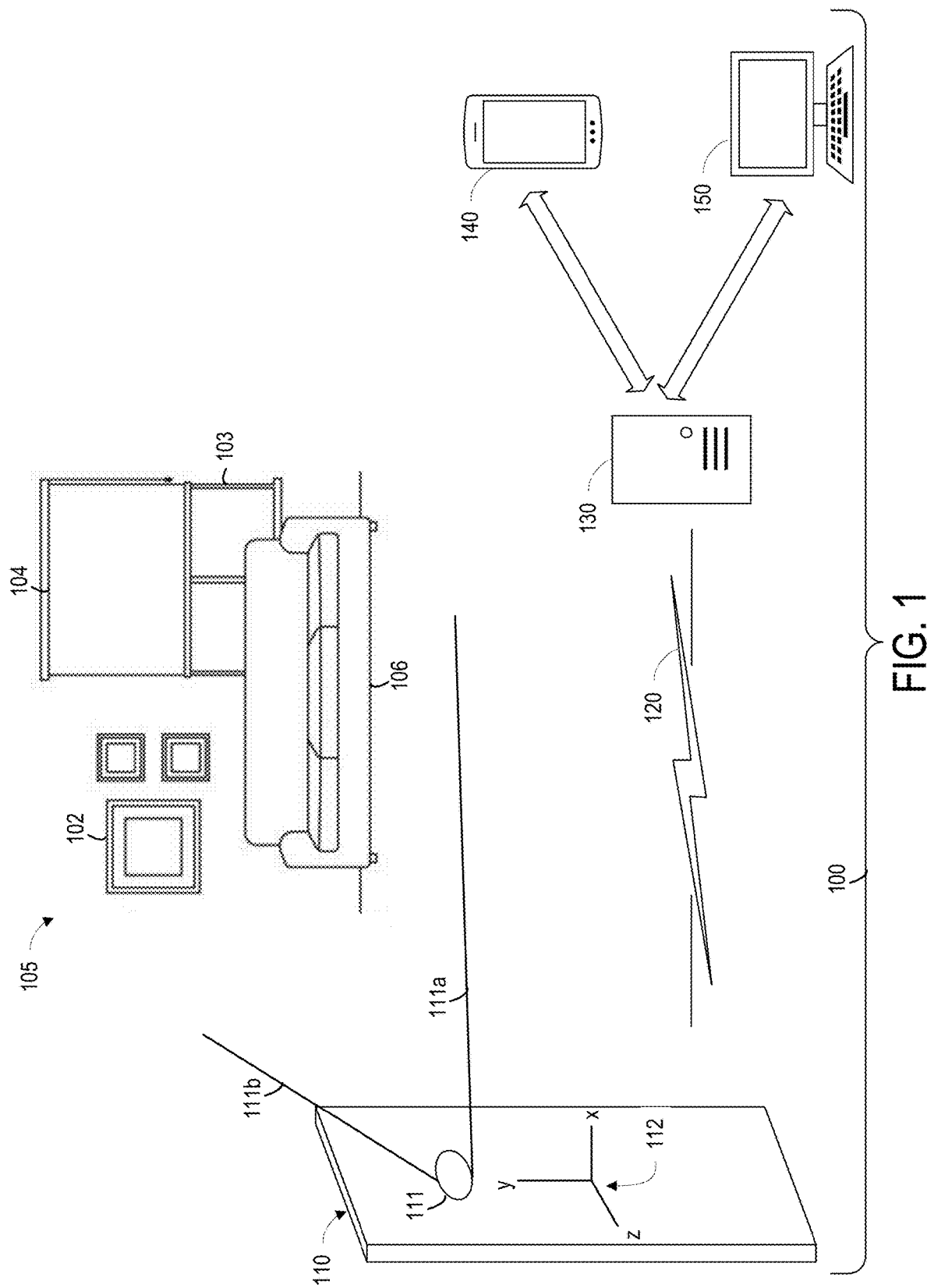
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

People increasingly rely upon remote communications technology to interact with each other. Modern smartphones, as well as camera-equipped laptops and desktop computers, can support the exchange of video data, to allow video chat as well as remote collaboration tools. For example, video conferencing can be blended with screen sharing and collaborative editing tools to allow a group of people who are remote from each other to collectively work on a document or other project over a video link.

As communications technology continues to advance, modern systems can additionally capture and/or transmit spatial data associated with video and audio. Systems can derive spatial data using various photogrammetric techniques, through which 3D spatial relationships can be ascertained. Depending upon the capabilities of a capturing device, depth data may be directly measured or calculated on the fly from captured video, possibly in conjunction with spatial position sensors in the capturing device. For example, most modern smartphones are equipped with an array of sensors beyond cameras and microphones; a modern smartphone may also include depth sensing, such as a Light Detection and Ranging (LiDAR) imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, the array of sensors allow for the relatively accurate capture and/or calculation of depth information for a captured scene.

This depth information can be provided as a point cloud, in one approach. The point cloud in turn can be used to construct a mesh representation or model of a 3D space. The mesh representation is obtained by repeatedly connecting sets of three depth points or vertices together with edges to form a mesh of triangles that approximates the 3D space from which the depth information was obtained. The number of vertices can be less than the number of points in the point cloud so the depth information can be represented more compactly.

The depth information may be obtained by using a suitably equipped device to scan or capture the 3D space. For example, the device may include a camera capable of capturing still or video images, and depth scanning sensors. The device can be static or moved such as by panning to capture a portion, or a 360 degree view, of the space. Further, because the position of the capturing device within the 3D space can be known relative to the depth data and determined with respect to each successive frame of video simultaneously captured by the device, extracted video frames can be mapped onto the 3D mesh to create a relatively realistic approximation of the 3D space.

For example, a user in their home may capture images of various objects in a home, such as cabinets and appliances in their kitchen, furniture, wall hangings and other decor in a living room, for use in planning a remodeling or redecorating project. The objects which are identified can be measured by identifying edges of the objects. This approach is particularly suitable for objects which have rectangular shapes. In one approach, the edges of the objects can be obtained from the mesh model.

However, inaccuracies can result, particularly when the resolution of the mesh model is reduced to save processing time and resources, such as for real-time and time constrained applications. Such applications have constraints on memory usage and execution times, precluding the use of high resolution volumes. For example, for large indoor environment reconstructions, particularly for real-time and time constrained applications, it is often required to reduce the resolution of the mesh by selecting a suitable voxel resolution of the 3D volume. Low resolution meshes allow for reduced processing times and efficient memory management, but may not be suitable for measurement applications since the reduced resolution can lead to inaccuracies in the measurements.

The techniques described herein address the above and other issues. In one aspect, adjacent planes of an object are detected from a mesh model of a scene. A common edge of the planes is then defined based on vertices of the mesh model. In one approach, triangles in the mesh are identified which have two vertices in one of the planes and a third vertex, e.g., an outlier vertex, in the other plane. A line is fitted to the outlier vertices to define the edge, and the outlier vertices are moved to the line, to define a mesh-based edge of the planes.

A further refinement involves using texture data from the captured images. In one approach, color frames of RGB pixels are converted to grayscale pixels. A set of grayscale pixels is evaluated to detect peak gradients/changes in the grayscale values. In one possible approach, a set of grayscale pixels corresponds to an outlier vertex. In another approach, to initially identify 2D lines based on grayscale images, outlier vertices need not be used. The locations of the peak gradient changes are then used to define a grayscale-based line. A final line is then obtained based on one or both of the mesh-based line and the grayscale-based line. The refinement is based on the observation that changes in the grayscale brightness often correlate with edges of objects, since the different surfaces of the object are lit with different intensities. The refinement is further based on the observation that raw pixel data, before down sampling, can provide a finer granularity regarding positions in the 3D space compared to the mesh vertices.

The position of the vertices on the mesh-based line is therefore used to guide the determination of the grayscale-based line. If the grayscale data alone was used to determine the edges, the results would likely be unreliable.

The techniques can be repeated for multiple adjacent planes of an object to more accurately define the edges of the object and therefore the overall size and shape of the object. A measurement process can then be performed such as to determine dimension of the object such as the length, width and height of the object, the area of surfaces of the object, the volume of the object, and so forth.

The techniques can use geometric primitives such as plane and line constraints to optimize geometry as a joint process. These geometric primitives are common in many scenes including those in indoor environments, where surfaces of walls, floors, doors, windows and some furniture items such as kitchen cabinets and counters have planar aspects. The techniques take advantage of plane information along with 2D line information to better optimize the mesh geometry to improve the edges.

This is in contrast to approaches which modify vertex positions based on face/vertex normals and vertex neighborhoods but do not consider texture. Although this type of post-processing can be performed relatively quickly, the movement of the vertex positions is not guaranteed to represent the true geometry of an object. On the other hand, algorithms which optimize geometry and texture as a joint process are not suitable for real-time or time constrained applications due to the fact that modifying geometry without any geometric primitives is time consuming.

The above and other benefits will be further understood in view of the following.

FIG. 1 illustrates a block diagram of the components of a system 100 for capturing an image and corresponding AR data, according to various embodiments. The system 100 may include a user device 110, e.g., a capturing device, such as a smartphone, tablet, desktop or laptop computer, two-in-one (a portable computer that includes features of both tablets and laptops), hybrid, wearable computer such as smart glasses or a smartwatch, or any other computing device that can accept a camera and provide positional information, as will be discussed in greater detail herein. The device may be implemented as a computer device 900 such as discussed in connection with FIG. 9. User device 110 further may include a camera 111 and a spatial position sensor 112 (depicted by a series of axes), which provides information about the spatial position of camera 111. It will be understood that camera 111 and spatial position sensor 112 may be contained within the body of device 110, as depicted in this example. Camera 111 is used to capture the surrounding environment of device 110, and by extension, the user. The camera can capture images of the space 105 within a field of view represented by boundary lines 111a and 111b. The environment may be a 3D space 105 such as a room, and may include one or more three-dimensional objects. In this example, the 3D space is a room which includes objects such as a framed picture 102 (e.g., a wall hanging), a window 103, a shade 104 for the window and a sofa 106.

Camera 111 may be any camera that can provide a suitable video stream for the intended purpose of user device 110. Where user device 110 is implemented as a smartphone or tablet, camera 111 may be one or more built-in cameras. In other embodiments, such as where user device 110 is a laptop, camera 111 may be built in or may be a separate, external unit. A suitable video stream may be a digital video stream, and may be compressed in embodiments using Advanced Video Codec High Definition (AVC-HD), H.264 (also known as MPEG-4 Part 10, Advanced Video Coding), MPEG-4, or another suitable compression scheme. Camera 111 may be configured to output standard or high-definition video, 4K video, or another resolution of video suitable for the intended purpose of camera 111 and user device 110. In other embodiments, the camera 111 of user device 110 may comprise multiple cameras or similar sensors, where one or more of the sensors may be configured to directly detect depth points, such as a 3D camera, LiDAR, or other suitable depth-sensing technology. In such embodiments, a point cloud of any space captured by camera 111 may be able to be at least partially obtained via direct measurement from the depth-sensing technology.

Spatial position sensor 112 may be configured to provide positional information about camera 111, such as the camera's pan and tilt. Other measured positional vectors may include camera movements, such as the camera rising or falling, or moving laterally. Spatial position sensor 112 may be implemented with micro or MEMS sensors, such as gyroscopes to measure angular movements and accelerometers to measure linear movements such as rises, falls, and lateral movements. In other embodiments, spatial position sensor 112 may be implemented using any suitable technology capable of measuring spatial movements of camera, including but not limited to depth sensors of the camera 111. In some embodiments, spatial position sensor 112 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 130, with which user device 110 communicates via a communication channel 120. Central server 130 may act to receive information from user device 110 such as video and depth data, which may be used with process flow 200 or methods 300 and 340, discussed below. In some embodiments, user device 110 may handle processing of video and depth information for a captured 3D space, including generation of a metaverse (a virtual-reality space in which users can interact with a computer-generated environment and other users), 3D mesh, and/or layout and estimation of measurements. However, depending upon the specifics of a given implementation, central server 130 may instead carry out some or all processing of the video and depth data to generate a spatial layout and estimation of dimensions of a 3D space captured by the user device 110, such as space 105. User device 110 may either handle a part of the processing, or simply act to acquire data about a 3D space and provide raw or partially processed data to central server 130 for further processing.

Also shown in system 100 are one or more additional user devices 140 and 150, which may be smartphones, tablets, laptops, desktops, or other servers. These additional user devices 140 and 150 may also be in data communication with the central server 130, and so may receive raw or processed data captured by user device 110 and/or a completed layout and estimation of measurements of the 3D space captured by user device 110. User devices 140 and/or 150 may be capable of interaction with the layout and estimations, as well as a generated 3D mesh or metaverse, received from central server 130. Further still, user devices 140 and 150 may engage in two-way or multi-way interaction with user device 110 through central server 130, with each device commonly working with a generated 3D mesh, metaverse, 2D or 3D layout, and/or estimates of spatial dimensions of the metaverse. It should be understood that devices 140 and 150 are merely examples, and are not indicative of the number or type of devices connected to central server 130; a given implementation may have an arbitrary number of devices connected to central server 130.

User device 110, as mentioned above, is in data communication 120 with central server 130, along with user devices 140 and 150. Data communication 120 may be implemented using any suitable data communication link technology, which may be wired, wireless, or a combination of both. Example communications technologies are discussed below with respect to FIG. 9.

Figure 2:
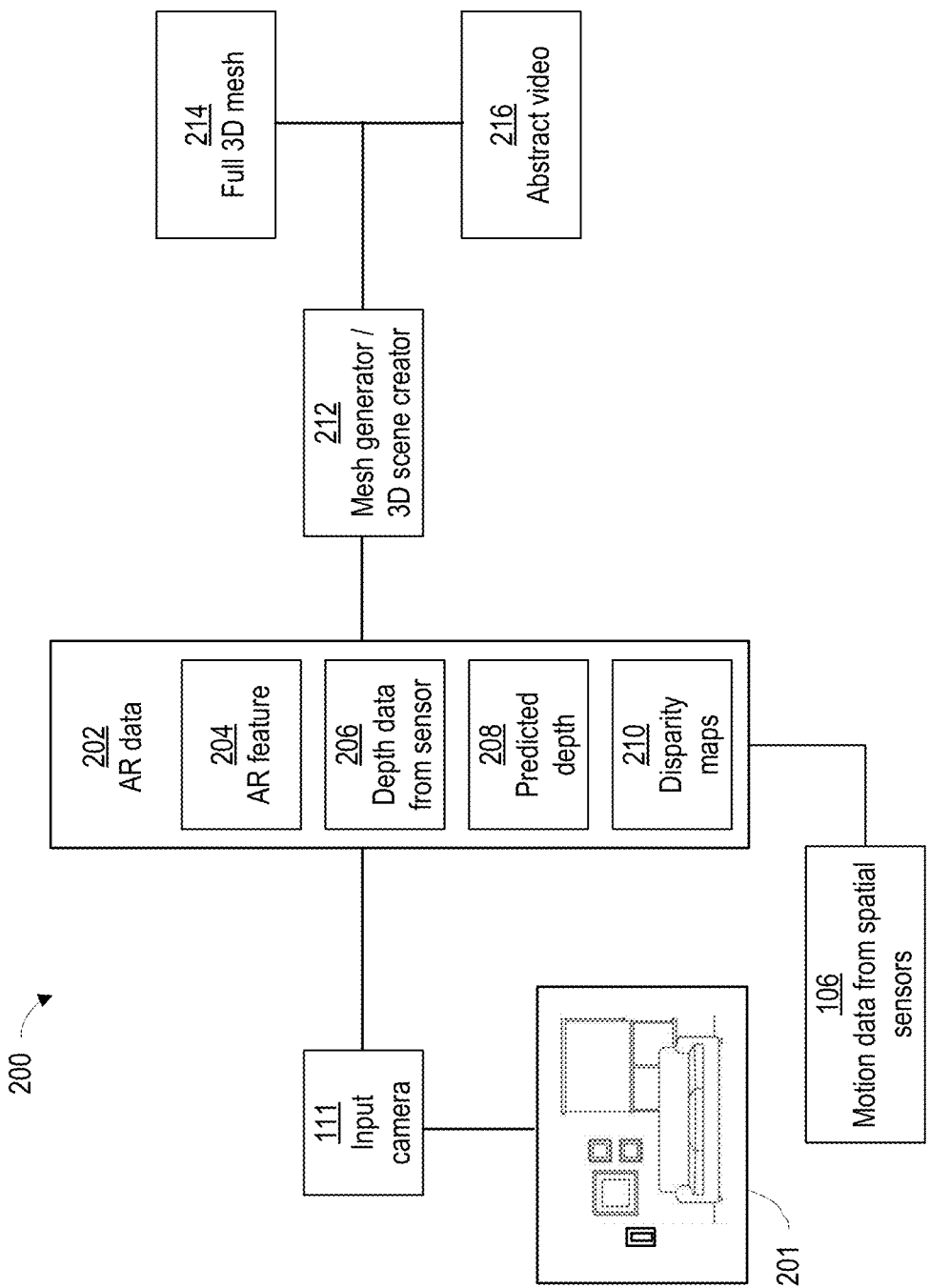
FIG. 2 depicts an example high-level process flow for generating a 3D mesh and virtual reconstruction from a captured video and associated AR data, according to various embodiments.

FIG. 2 depicts an example high-level process flow for generating a 3D mesh and virtual reconstruction from a captured video and associated AR data, according to various embodiments. Process flow 200 may be carried out by one or more components of the system 100, in various embodiments. Initially, a video 201, or one or more images, such as an image of the space 105 of FIG. 1, is captured by an input device, such as the camera 111, along with associated motion data (not depicted). This video 201 is then, in embodiments, partially or wholly processed by the AR application programming interface (API) of the capturing device to generate AR data 202, which may be tagged to the video 201. Examples of an AR API include ARKit, an augmented reality (AR) development platform for iOS mobile devices developed by Apple Inc., and ARCore, a platform for building augmented reality experiences developed by Google LLC.

Note that, as used herein, AR data 202 is not (only) data about AR objects. Rather, AR data 202 includes 3D point cloud data that corresponds to video 201 that may be useful to create a 3D mesh of the captured 3D space, as well as other useful analysis, such as plane detection and semantic segmentation. Furthermore, in some embodiments, the AR API of the capturing device may include semantic segmentation as part of AR data 202.

This AR data 202 may then be used to generate a layout and/or metaverse or virtual representation of the 3D space by a mesh generator/3D scene creator 212. Finally, the mesh and/or 3D scene can be used to generate a full 3D mesh 214, which includes one or more frames from the video 201 (and/or other sources of relevant images) mapped upon the 3D mesh 214 to generate a relatively realistic model. Additionally, an abstract video 216, which may comprise a layout or metaverse model of the scene captured by the camera 111, may be generated from the detected points in the point cloud. The model can then be used in an interactive fashion.

AR data 202 may be captured contemporaneously with and/or extracted from, video 201, and may be tagged to video 201. AR data 202 may include AR feature point data 204, depth data from the sensor 206, motion data from spatial sensors 112 (shown in FIG. 1), predicted depth data 208, and/or disparity maps 210. Other embodiments may include additional data types, different data types, or fewer data types. The various types of AR data 202 may be derived from various raw data inputs, including Red-Green-Blue (RGB) images (such as the sequence of frames of video 201), intrinsic camera parameters and/or camera transform data (such as from camera 111 and/or spatial position sensor 112), 3D feature points, and/or depth images from a depth sensor (LiDAR, stereo camera, etc.), among other types of possible data. RGB images may be extracted from frames of the video captured by camera 111. An RGB image defines red, green, and blue color components for each individual pixel of the image.

Intrinsic parameters of a camera, such as camera 111, are parameters that are internal and fixed to a particular camera. These parameters characterize the optical, geometric, and digital characteristics of the camera and may include: (1) the perspective projection (e.g., focal length), (2) the transformation between image plane coordinates and pixel coordinates, and (3) the geometric distortion introduced by the optics.

In addition to motion data from spatial position sensor 112, intrinsic camera parameters can include various known or readily determined properties of camera 111, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 111 is focused relatively far away from the camera position, and/or the camera 111 utilizes a small aperture (relatively high f-stop, such as f/8, f/11, etc.), so as to offer a large depth of field.

Camera transforms can include the various variables necessary to transform between the 3D objects within the field of view of camera 111 and the 2D image plane of the camera 111. Such variables can include information about the spatial location of the capturing device. 3D feature points can include feature points which can be used by the AR API to create the AR feature point data 204, and may be extracted from video 201, such as various anchor points or features, and/or captured using one or more sensors that are separate from video 201, such as spatial position sensor 112. Depth images can include imaging captured by a depth-sensitive device, such as a LiDAR sensor or infrared range finder, to allow for direct, and potentially more precise, depth measurements of various points within the scene captured by camera 111. Where direct depth measurements are available, data similar to that available for camera 111 may be used (e.g., intrinsic camera parameters and camera transforms) to process the depth measurements and correlate with the images from camera 111.

Depth measurements may be combined with x-y locations for a given frame to form a 3D point cloud that may be associated with a given image or frame from video 201, so that each or most frames of video 201 have an associated 3D point cloud. Collectively, the 3D point clouds may be merged or otherwise consolidated to create a 3D point cloud associated with video 201, with each frame of video 201 correlated to a particular section of the 3D point cloud. The 3D point cloud may be utilized to generate a 3D mesh, as described herein.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 112 or a depth-sensitive device. Identified features including edges, points, and planes may be used to create a 2D or 3D layout and/or metaverse. Further, these feature points may correspond to segmented portions of the captured 3D scene, such as distinguishing a wall, window, picture, or other planar feature from identified planes such as walls, floor, ceiling, etc.

Depth data from sensor 206 may include the direct depth measurements, which may be correlated with identified AR feature point data 204 by the AR API. Corollary to or alternative to depth data from sensor 206 includes predicted depth data 208, which the AR API may derive from techniques such as machine learning, photogrammetry/comparison between proximate frames of the captured video, and/or any other suitable technique now known or later developed. The depth data from the sensor 206 and the predicted depth 208 may comprise a point cloud that, when interconnected, comprises a 3D mesh, with the points forming the vertices of the mesh polygons such as triangles.

Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/3D scene creator 212 receives the AR data 202 and uses it to generate a 3D mesh, which may then be output as a full 3D mesh 214 and/or an abstract video 216, or layout and/or metaverse. The resulting output from the mesh generator/3D scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. The full 3D mesh 214 provides a geometric representation of the captured 3D space. The full 3D mesh 214 can be used for various purposes, such as simulating physical interactions with objects in the 3D space represented by the full 3D mesh 214, taking measurements of the represented environment, later exploration or walkthrough, or another suitable purpose.

An abstract video 216 can also be output, which may be or include a virtual representation such as a metaverse, and/or a 2D or 3D layout. As with the full 3D mesh 214, such a layout or virtual representation reflects the physical geometry of the captured 3D space, and may include measurements of the captured space that reflect the actual physical dimension of the captured 3D space. In this respect, the virtual representation/layout/metaverse is equivalent in physical dimensions to the captured 3D space, albeit as a digital representation.

As it is a video, abstract video 216 may be constructed by manipulating a camera viewpoint of 3D mesh 214 to correspond with the camera movements of input camera 111 that may be detected by spatial position sensors. The 3D mesh 214 may be rendered with generic shading and/or generic object models that fit to the 3D mesh 214, rather than texturing using images from the captured video. By providing a generically shaded 3D mesh 214, an abstract video is thus created as the camera view point moves about the generic mesh in a way that corresponds to the changing view of the initial captured video.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL (hue, saturation, lightness), CMYK (cyan, magenta, yellow, and key), or another method of expressing color, in alternative embodiments. In still other embodiments, the image information may comprise black and white or greyscale information, with no color information. Further still, other embodiments may utilize a combination of color and greyscale/black and white images.

Figures 3A, 3B:
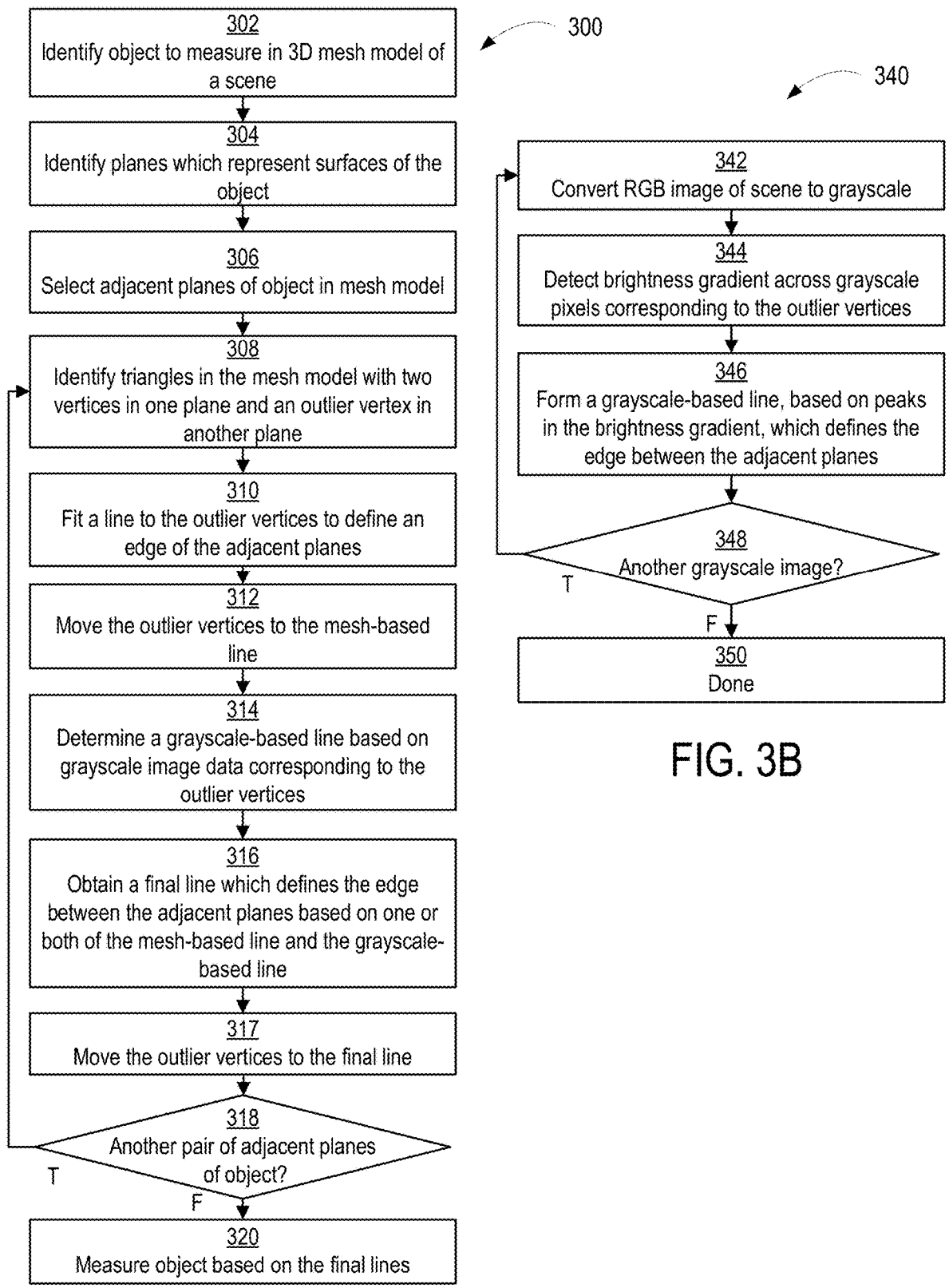
FIG. 3A is a flowchart of the operations of an example method 300 for identifying edges of an object, according to various embodiments.
FIG. 3B is a flowchart of the operations of an example method 340 for performing operation 314 of FIG. 3A, according to various embodiments.

FIG. 3A is a flowchart of the operations of an example method 300 for identifying edges of an object, according to various embodiments. The method provides a post-processing procedure, after a mesh model is obtained, to improve the object edges, so as to bring back the lost geometry of the objects. Generally, given an input 3D mesh and a set of input RGB-D images with respective camera poses, the method improves the quality of the reconstructed mesh by enhancing the edges using 3D plane and 2D line constraints. The method includes a mechanism which can identify edges of the mesh and improve the sharpness of the mesh, and are particularly useful for measurement applications in which the edge positions and lengths should be accurate to allow for accurate measurements of the object. The method can include identifying 3D plane borders from mesh geometry, identifying 2D lines from RGB images, and enhancing the mesh geometry using 2D RGB data, 3D plane data, and 2D line constraints.

Figure 8:
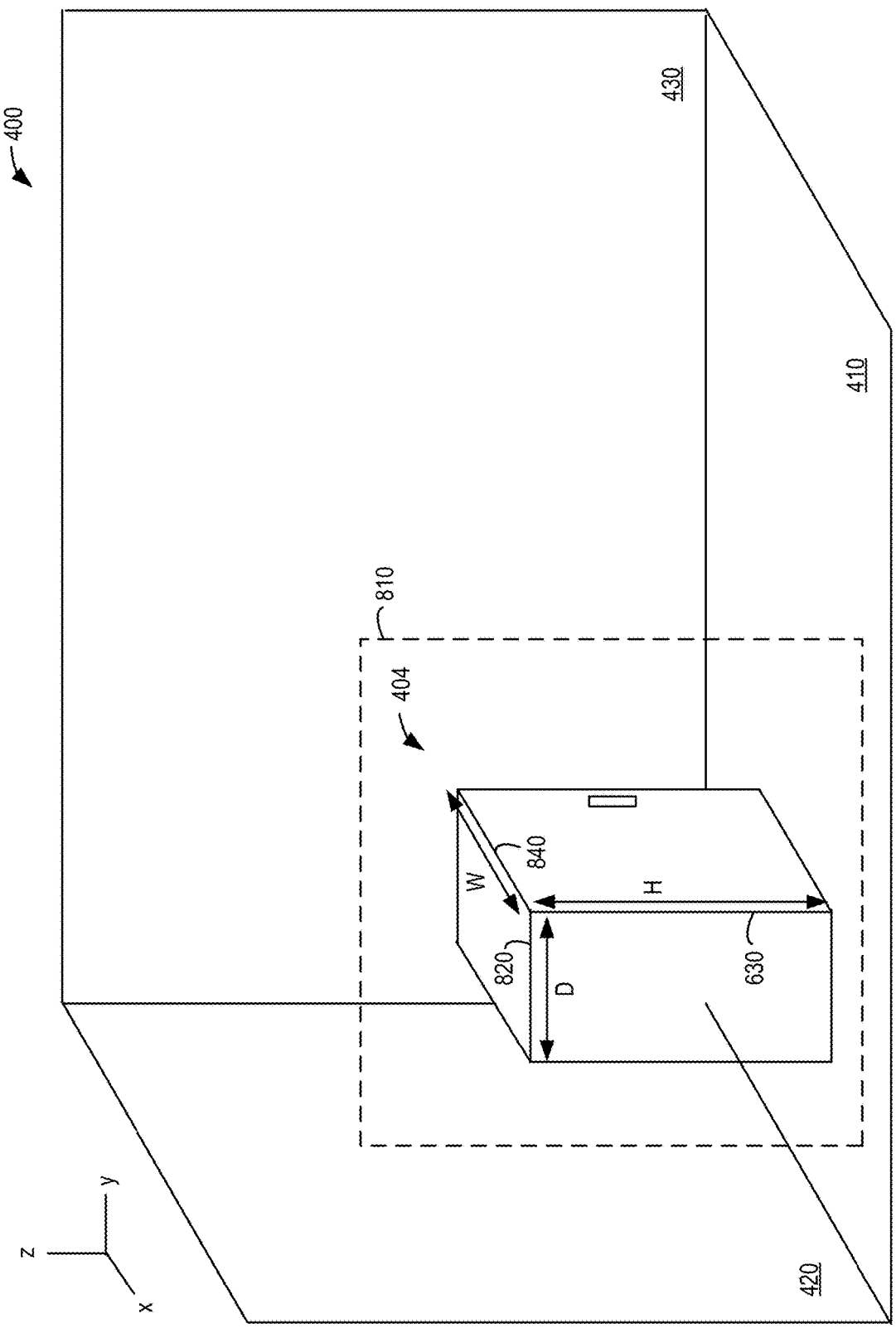
FIG. 8 depicts measurements of the object 404 in the 3D space 400 of FIG. 4, consistent with operation 320 of the method of FIG. 3A, and the adjusted edge represented by the line 630 of FIG. 6B, according to various embodiments.

In the example method, operation 302 includes identifying an object to measure in a 3D mesh model of a scene. For example, this could involve the user manually drawing a bounding box 810 around the object on a tablet or other display screen, such as depicted in FIG. 8. For instance, the user may wish to identify a cabinet or other item of furniture. In another approach, operation 302 is not used and the subsequent operations are performed on each of the objects in the mesh model. Each of the objects may have been previously identified, such as using an object recognition technique.

Operation 304 includes identifying planes which represent surfaces of the object. In one approach, a plane is represented by vertices which have a common depth or a depth which varies uniformly over a group of vertices. The group of vertices in a plane can include vertices whose locations are consistent with the equation of a plane, which may have the format: $ax+by+cz=d$, where x, y and z and the Cartesian coordinates and a, b, c and d are constants. See the example x, y and z coordinates in FIGS. 4 and 8. See the example planes 502 and 504 in FIG. 5A.

Operation 306 includes selecting adjacent planes, e.g., first and second planes, of the object in the mesh model. This can be done automatically, for example, by identifying one plane which is adjacent to another plane when moving in the x, y or z directions in the mesh model.

Operation 308 involves identifying triangles, e.g., triangular surfaces, in the mesh model having two vertices in one plane, e.g., a first plane, and an outlier vertex in another plane, e.g., a second plane. These identified triangles can also be referred to as outlier triangles or dual-plane triangles, as opposed to same-plane triangles, which have all three vertices in one plane. The outlier triangles span an edge of adjacent planes by including one or more vertices in each plane. For example, in FIG. 5A, vertices 520-525 are outlier vertices. Each circle represent a vertex of the mesh model 500, and the lines which connect the vertices form triangles. For example, a triangle T1 is formed by vertices 521, 542 and 543.

Operation 310 involves fitting a line to the outlier vertices to define an edge of the adjacent planes, e.g., a common edge. See the mesh-based line 530 in FIG. 5A, for example, which is fitted to vertices 520-525. In one approach, the least square method is used to define the mesh-based line. The least square method minimizes a sum of the squares of the errors of the vertices relative to the line. This approach involves a straight line, but the approach is generally applicable to curved lines as well.

In another possible option, a line is fit based on each of the vertices of the triangles which span the two planes. Other options are possible as well.

Operation 312 involves moving the outlier vertices to the mesh-based line. See FIG. 5B, for example, where the outlier vertices 520-525 are moved to provide adjusted vertices 520a-525a, respectively. The movement can be perpendicular to the mesh-based line, for example. The mesh-based line defines a common straight edge of the two adjacent planes. By moving the vertices, the mesh model defines a common edge which corresponds to the mesh-based line, to more accurately represent the object.

Operation 314 involves determining a grayscale-based line based on grayscale image data corresponding to the outlier vertices. See the grayscale-based line 630 of FIG. 6B, for example, and the methods of FIGS. 3B and 6D. As mentioned, the mesh-based line alone is subject to inaccuracies due to factors such as a relatively low mesh resolution. The grayscale-based line provides additional information regarding the edge to provide a refined estimate of the edge position. Combining the grayscale-based line data with mesh-based line data may allow for cross-checking or cross-correlation, where errors in one type of data may be corrected using the other type of data to result in a line that is more accurate to the actual geometry of the captured space than would be yielded by either type of data by itself. For example, where some vertices are outlier vertices, apparently existing on an adjacent plane such that the constructed triangle appears to straddle, clip, or otherwise cut through the edge, grayscale-based line data may confirm the presence of a continuous edge over the possibility suggested by the mesh-based data that the edge gives way to an angular face or additional face defined between the two planes.

In one approach, the position of the mesh-based line is used to guide the determination of the grayscale-based line. As mentioned, if the grayscale data alone was used to determine the edges, the results would likely be unreliable. For example, for each vertex of the mesh-based line, a corresponding set of grayscale pixels can be identified which extends in a direction in an image corresponding to a perpendicular of the mesh-based line. The grayscale value can be evaluated in the set of pixels. See FIG. 6A, for example, where a set of pixels 700 corresponds to the vertex 520a, and extends along a line 712 which has a direction corresponding to the direction of the line 602, perpendicular to the mesh-based line 530. Further, the set of pixels can correspond to points in the mesh which extend within a range R which is centered about the vertex 520a and the mesh-based line 530. As discussed further in connection with FIG. 6A, grayscale values of the set of pixels are evaluated to detect a peak gradient location 705, and this location is ray cast to the mesh model to identify a point 520b which is used to form the grayscale-based line.

The range R in the 3D space can be a predetermined value in some cases. The range R could be a function of the length of the mesh-based edge, such as a fixed percentage, e.g., 5-10% of the length. The range can be centered about an outlier vertex.

Operation 316 involves obtaining a final line which defines the edge between the adjacent planes based on one or both of the mesh-based line and the grayscale-based line. In one approach, the mesh-based line and grayscale-based line are combined to provide the final line. For example, in FIG. 6C, a final line 635 represents an average position between the mesh-based line 530 and the grayscale-based line 630. In this case, it can be said that the mesh-based line is modified or adjusted based on the grayscale-based line. In another option, the grayscale-based line replaces the mesh-based line to define the edge.

Operation 317 involves moving the outlier vertices to the final line. For example, see FIGS. 6B and 6C. This adjusts the edge of the mesh to increase its accuracy for subsequent processing of the mesh such as obtaining measurements.

A decision operation 318 determines whether there is another pair of adjacent planes of the object. If the decision operation is true (T), operations 308-316 are repeated with regard to the another pair of adjacent planes. If the decision operation is false (F), operation 320 may be performed in some embodiments to measure the object based on the final lines which define the edges of the object. See the measurements in FIG. 8, for example. In the view of the object 404, there are three edges which may be defined, including the top front edge 840, the top side edge, represented by the line 630, and the side edge 820. Other edges of the object may be detected as well from other images.

The measurements of the object can be determined from the edges based on the lengths of the lines which represent the edges of the objects. Furthermore, it should be understood that operation 320 is only one possible example, and may be substituted for any other operation for which the refined lines of the mesh may be useful. Operation 320 may be omitted in some instances, or may be performed at some indefinite future time after the refined lines have been computed per the previous operations of method 300.

A process for providing a mesh model for use in FIG. 3A can include capturing/processing one or more frames of color data and depth data, and creating a sparse 3D point cloud from the depth data. For example, see the sparse 3D point cloud 402 of FIG. 4. Typically, a depth value is obtained for each pixel in a frame, where there are multiple rows of pixels. A sparse 3D point cloud is obtained by down sampling, such as by using every fifth or tenth pixel in each row of a frame and/or by using every fifth or tenth row in a frame. In one option, for better reconstruction, any point having a depth which exceeds a specified maximum or other predetermined threshold is eliminated.

The video may comprise RGB data. The color data and depth data can be captured concurrently. The RGB frames can be used to render texture on a mesh model. The captured video may come from a variety of sources. In some examples, a camera attached to or integrated with a capturing device, such as user device 110 with camera 111, is used to capture the video. In other examples, a different device or devices may be used to capture the video that are separate from the capturing device. The depth data may come from, in some examples, other sensors as described above with respect to FIGS. 1 and 2, such as spatial position sensor 112 on a user device 110. In embodiments, the video and depth data are captured contemporaneously to ensure appropriate association between the depth data and corresponding video frames. The video and associated depth data may be captured at a previous time, and stored into an appropriate file format that captures the video along with the raw feature points and motion data. Various operations of method 300 may then be performed on the stored video and associated data in post-processing.

After the video sequence is processed, key frames can be used for various purposes such as generating a 3D mesh representation of the 3D space. Key frames are frames which contain information which is helpful in generating the mesh model. Key frames are frames in which the camera/depth sensor sees the scene from different perspectives. A key frame can be selected when the camera/depth sensor looks at new area of a 3D space for the first time, or when the camera/depth sensor looks at an area which was already looked at, but from a better (closer) distance and better (more direct) point of view. Key frames capture a scene and the objects in it from different perspective so that the process is made more efficient. In one approach, a frame can be selected as a key frame when the camera has made a significant movement, such as detected by an accelerometer or a camera pose data. Also, the initial frame in a video sequence can be identified as a key frame.

In this case, the point clouds of depth data associated with the key frames are selected. For example, a cloud of points each with positional data in three dimensions with respect to a predetermined reference, can be obtained from the captured video and depth data, also as described with respect to FIGS. 1 and 2. The point cloud may be processed to generate a 3D mesh, such as by repeatedly connecting each of the points in the point cloud into groups of three to form a mesh of triangles. See the example mesh model 500 of FIG. 5A, for example. Each of the points then becomes a vertex for one or more triangles, with edges of the various triangles formed by the connection between two adjacent points. In some embodiments, the depth points or the 3D mesh may be at least partially obtained using simultaneous localization and mapping (SLAM), or another suitable technique, which may be carried out on the device by the AR API. SLAM is the computational problem of constructing or updating a map of an unknown environment while simultaneously keeping track of the location of an agent, e.g., camera, within it.

In embodiments where the video is provided as a file from a past capture, the depth data may be stored with the video, and correlated to each video frame. In other embodiments, the depth data may be calculated from a raw video using photogrammetric and/or other suitable techniques.

Depending upon the capabilities of an implementing system or device, the operations may be performed progressively while the video is being captured, or may be performed on a complete captured video and associated depth data, such as when the user plays back a video of the 3D space on the device 110. Note that the frames can be processed in the time order in which they are captured, or in a different order.

FIG. 3B is a flowchart of the operations of an example method 340 for performing operation 314 of FIG. 3A, according to various embodiments. Operation 342 involves converting an RGB image of the scene to grayscale. One example approach is to take the average of the values of the red (R), green (G) and blue (B) components according to grayscale=(R+G+B)/3, for each pixel in the image. Or, this step can be limited to the pixels which correspond to the identified object in operation 302. Another example approach is a weighted method, also referred to as the luminosity method, which weighs red, green, and blue according to their wavelengths, e.g., grayscale=0.299R+ 0.587G+0.114B. Optionally, the captured images are already in grayscale so no conversion is done. Other options are possible as well.

In a grayscale image, the hue (apparent color shade) and saturation (apparent color intensity) of each pixel is equal to 0. The lightness (apparent brightness) is the only parameter of a pixel that can vary. Lightness can range from a minimum of 0 (black) to 100 (white), in one approach. In another approach, for each pixel, a color can be defined using three integer values from 0 to 255 for red, green, and blue, where a zero value means dark and a value of 255 means bright.

Figure 7A:
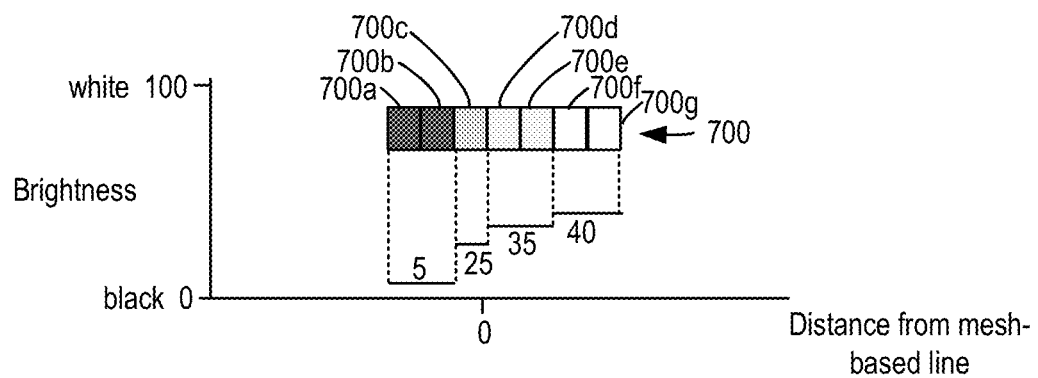
FIG. 7A depicts an example plot of brightness versus distance, consistent with the set of grayscale pixels 700 of FIG. 6A, operation 344 of the method of FIG. 3B, and the method of FIG. 6D, according to various embodiments.

The grayscale brightness may then described using a value ranging from 0 (black) to 255 (white). The brightness can be normalized to a scale of 0-100%, for example, such as depicted in FIG. 7A, where a grayscale value of 255=100%.

Operation 344 detects a brightness gradient across the grayscale pixels corresponding to the outlier vertices. See FIGS. 6A, 7A and 7B, for example. As mentioned, the locations of the peak gradients in the grayscale pixels can be used to define a grayscale-based line, based on the observation that changes in the grayscale brightness often correlate with edges of objects, since the different surfaces of the object can be lit with different intensities. In one approach, a gradient is determined for a set of grayscale pixels which correspond to each vertex of the mesh-based line. The gradient represents a change in grayscale value for pixels which extend in a direction in the image which corresponds to a perpendicular of the mesh-based line. For example, see the perpendicular line 602 of the mesh-based line 530 in FIG. 6A. The gradient can represent a change between adjacent pixels, for example.

Operation 346 involves forming a grayscale-based line based on peaks in the brightness gradient, which defines the edge between the adjacent planes. See the example grayscale-based line 630 of FIGS. 6B and 6C. The peaks are locations in which the magnitude of the grayscale value changes most significantly between adjacent pixels, for example. For example, see the location 705 in the set of pixels 700 in FIG. 6A. The grayscale-based line is an example of a texture-based line.

In some cases, when the peaks are below a specific magnitude, the corresponding locations in the mesh are ignored and do not contribute to the grayscale-based line. However, it should also be appreciated that the position of the capturing camera relative to the object giving rise to the brightness gradient may impact on identification of the peaks in the brightness gradient. For example, an edge captured from a relatively close position and so represented by numerous image pixels may show a more gradual rise or change in gradient to a peak than an edge captured from a relatively distant position that is accordingly captured with fewer pixels. Furthermore, for edges captured using numerous image pixels, e.g. up close, peaks in the brightness gradient may be spread across multiple pixels, while edges captured using relatively few pixels may have peaks captured in only a few pixels or one pixel. Thus, close-captured edges may demonstrate a more gradual and gentle peak compared to distant-captured edges. Distance data associated with a given image may be used in some embodiments to determine a threshold for when peaks should be ignored.

A decision operation 348 determines whether there is another grayscale image to process. If the decision operation is true, operations 342-346 are repeated for a next RGB image. If the decision operation 348 is false, the process is done at operation 350.

In one approach, the operations are performed using the same frames, e.g., key frames, which are used to generate the mesh model for use in the process of FIG. 3A. By repeating the method 340 with image data from different perspectives, existing grayscale-based line data can be confirmed and the line may be extended to previously unseen areas. In one approach, a final grayscale line is obtained from a combination of multiple grayscale lines, such as by an averaging process.

Grayscale data is an example of texture data which is captured in an image. Note that while the method of FIG. 3B involves using grayscale data to refine the edges of an object, it is possible to use other types of texture data as well.

Figure 4:
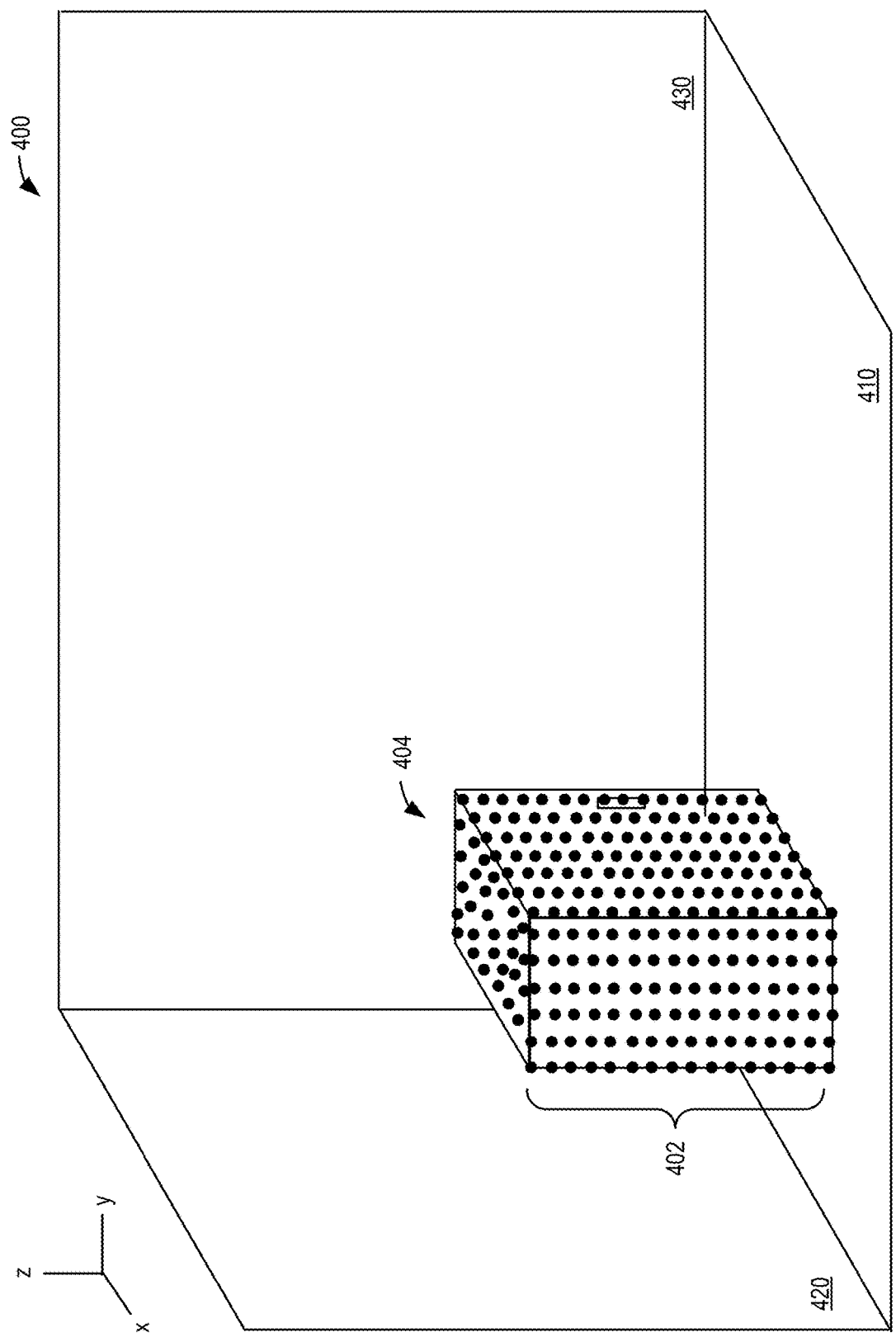
FIG. 4 depicts an example view of a 3D space 400 which includes an object 404, and a sparse 3D point cloud 402 which represents the object, for use with the method of FIG. 3A, according to various embodiments.

FIG. 4 depicts an example view of a 3D space 400 which includes an object 404, and a sparse 3D point cloud 402 which represents the object, for use with the methods of FIGS. 3A and 3B, according to various embodiments. The 3D space is a room which includes a floor 410, a back wall 420, a side wall 430 and an object 404 such as a cabinet, which is hexahedral with rectangular planar surfaces. A coordinate system represents x, y and z axes. The view is offset from a central view of the object and shows the left side and front surface of the cabinet.

An example sparse 3D point cloud 402 is also depicted. Each point of the point cloud is represented by a black circle. The points extends in uniform rows and columns as a simplification; it will be understood that actual point clouds may have a more random arrangement of points. The points extend along the front, side and top surfaces of the cabinet. These are portions of the object which are in the field of view of the capturing device in the current image. The mesh could also depict the walls and floor of the 3D space, but this portion of the mesh is omitted from the image for simplicity.

As mentioned, the points can be used to generate a 3D mesh model of the objects in a 3D space. In one approach, the points are connected to form triangles, where the points are vertices of the triangles. Each triangle is a face which represents a portion of the surface of an object.

FIG. 5A depicts a mesh model 500 of a portion of the object 404 of FIG. 4, where the mesh model includes vertices on adjacent planes 502 and 504, and a mesh-based line 530 defines an edge of the adjacent planes, consistent with operation 310 of the method of FIG. 3A, according to various embodiments. The line 530 is referred to as a mesh-based line since it is defined based on the mesh model. As mentioned, the vertices of the mesh model can be classified into planes such as planes 502 and 504 which correspond to the front and side surfaces, respectively, of the object 404. To aid in understanding, the vertices of the plane 502 are open circles and the vertices of the plane 504 are dark circles. Also, as mentioned in connection with operation 308, some of the triangles of the mesh model have two vertices in one plane and another, outlier vertex in an adjacent plane. For example, the triangle T1 is defined by two vertices 542 and 543 in plane 504 and an outlier vertex 521 in plane 502. Other triangles are processed similarly to identify other outlier vertices 522-525. A best fit line can be defined based on the outlier vertices as the mesh-based line 530.

FIG. 5B depicts a mesh model 500a obtained from the mesh model 500 of FIG. 5A by moving the vertices 520-525 to the mesh-based line 530 to provide adjusted/moved vertices 520a-525a, respectively, consistent with operation 312 of the method of FIG. 3A, according to various embodiments. As mentioned, the outlier vertices can be moved to the mesh-based line, such as by moving in a direction which is perpendicular to the mesh-based line. The movement of the vertices 520-525 is depicted by small arrows. In this example, three outliers in plane 502 are moved, e.g., vertices 520, 521 and 522, and three outliers in plane 504 are moved, e.g., vertices 523, 524 and 525. This movement redefines the mesh model so it more accurately represents the edge. In some embodiments, where the values/locations of the various points of the 3D point cloud correspond with the vertices, adjusting the vertices 520-525 may likewise update the values of the corresponding points in the 3D point cloud to the values reflecting vertices 520a-525a.

Figure 6D:
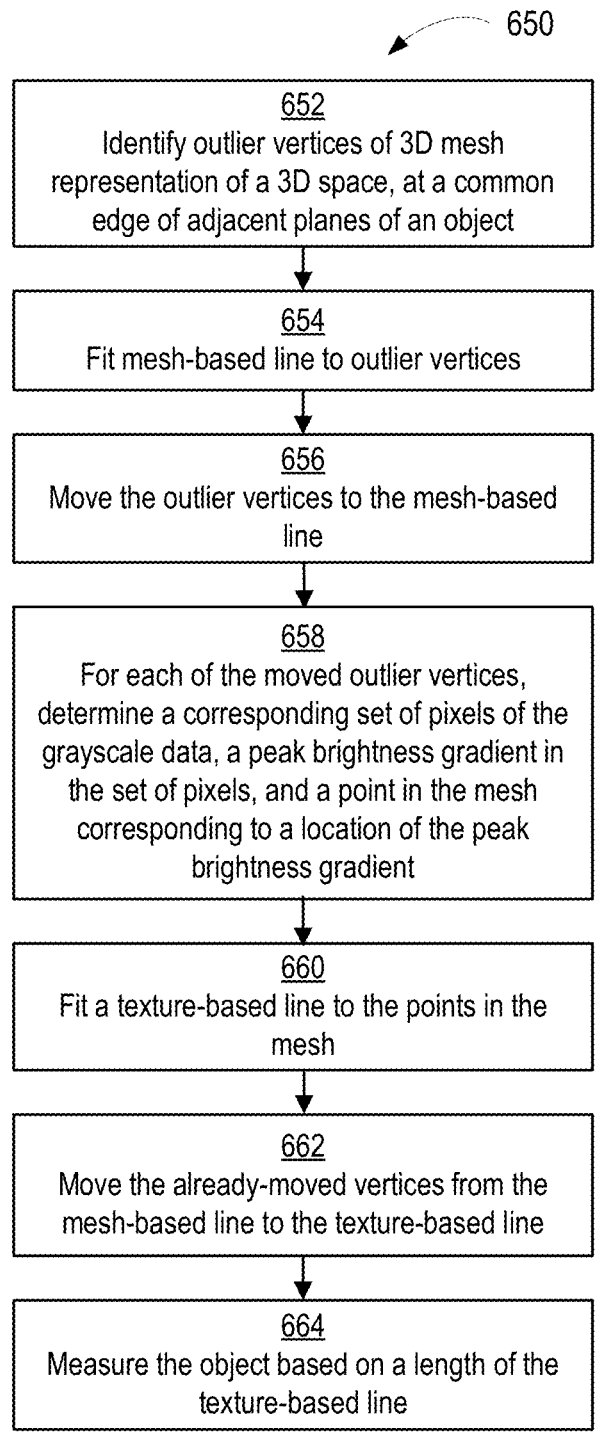
FIG. 6D is a flowchart of the operations of an example method 650 for determining a texture-based line consistent with FIG. 6A, according to various embodiments.

FIG. 6A depicts an example correspondence between a vertex 520a of the mesh model and a set of grayscale pixels 700, and a correspondence between a location 705 of a peak gradient in the set of pixels 700 to a point 520b in the mesh model, consistent with operations 344 and 346 of the method of FIG. 3B, according to various embodiments. See also the method of FIG. 6D.

In embodiments, each point in the 3D mesh model corresponds to a pixel in an image based on the camera pose at the time the image was captured. In particular, the correspondence can be determined using ray tracing, a process which defines a light ray as a straight line which extends from a pixel in the image, through the focal point of the capturing device, to the mesh model, or in the opposite direction, from the mesh model to a pixel in the image. The intersection of the ray with the mesh model is a point which corresponds to the pixel.

In one possible approach, the vertex 520a (an outlier vertex which was moved to the mesh-based line) is ray traced by a ray represented by the arrow 604 to identify the corresponding pixel, which is the pixel 700d n the image 710, in this example. This can be considered an initial or central pixel of a set of pixels in which the brightness gradient is evaluated. Additional pixels are then identified which are adjacent to the initial pixel, on both sides of the initial pixel, in a path 712 which has a direction in the image corresponding to a direction of the line 602 in the mesh model and 3D space. The initial pixel and the additional pixels form a set of pixels in a range of the set of pixels may correspond to a range R in the mesh model which is centered about the mesh-based line 530. The range R, as alluded to above, may vary depending on such factors a camera intrinsics, image resolution, distance from the surfaces, etc., depending on the needs of a given embodiment.

For example, the additional pixels can include the pixels 700a, 700b and 700c on one side of the initial pixel 700d, and pixels 700e, 700f and 700g on an opposite side of the initial pixel 700d. This example has an equal number of pixels on each side of the initial pixel. Based on the brightness gradient among the pixels in the set of pixels, a location 705 in the image, within the set of pixels, and between the pixels 700b and 700c, is determined as a location of a peak brightness gradient. A ray represented by the arrow 605 extends from the location 605 and is then used to identify a corresponding point 520b in the mesh. This point represents the location of an edge according to the grayscale data. The point 520b is offset from the vertex 520a along the line 602 by a distance d.

A different set of grayscale pixels can be determined similarly for each of the other outlier vertices. A peak brightness gradient can be determined for each of these sets of pixels, with ray casting back to the mesh model, to obtain the grayscale-based points 521b-525b depicted in FIG. 6B.

FIG. 6B depicts an example grayscale-based line 630 which defines an edge between the planes 502 and 504 of FIG. 5A, consistent with operation 346 of the method of FIG. 3B and with FIG. 6A, according to various embodiments. The line 630 can be defined by points 520b-525b (represented by squares) which represent points in the mesh which correspond to peak-gradients of the grayscale pixels, in one approach. Each point may be on a line which is perpendicular to the line 530, in one approach. For example, the point 520b is on the line 602 which is perpendicular to the line 530. The line 630 can be obtained using a least squares fit of the points 520b-525b, for example.

The mesh-based vertices 520*a*-525*a* can be moved to the locations of the grayscale-based points 520*b*-525*b*, respectively, in one approach, consistent with operation 317 of FIG. 3A. The vertex 520*a* is moved by a distance d, for example, to the point 520*b*. This movement further redefines the mesh model so it more accurately represents the edge.

FIG. 6C depicts an example line 635 which is between the mesh-based line 530 and the grayscale-based line 630 of FIG. 6B, according to various embodiments. The line 635 can represent a midway or average position between the lines 530 and 630, for instance. The line 635 may represent the final line of operation 316 of FIG. 3A, for example. The line 635 can be used to define points 520*c*-525*c* which are between vertex 520*a* and point 520*b*, vertex 521*a* and point 521*b*, vertex 522*a* and point 522*b*, vertex 523*a* and point 523*b*, vertex 524*a* and point 524*b*, and vertex 525*a* and point 525*b*, respectively.

The mesh-based vertices 520*a*-525*a* can be moved to the locations of the grayscale-based points 520*c*-525*c*, respectively, (represented by triangles) in one approach, consistent with operation 317 of FIG. 3A. The vertex 520*a* is moved by a distance d/2, for example, to the point 520*c*.

FIG. 6D is a flowchart of the operations of an example method 650 for determining a texture-based line consistent with FIG. 6A, according to various embodiments. As mentioned, a grayscale-based line is an example of a texture-based line. The method generally involves first refining the edge of the mesh model. As seen in FIG. 5A, for example, there is initially no straight edge between the planes. If an edge was to be defined using the existing vertices, it would be jagged or possibly result in a non-existent or phantom third face at an angle to the planes that define the edge. By fitting a mesh-based straight line to the vertices, such as the outlier vertices, and moving the vertices to the mesh-based line, a straight line can be defined which represents the edge. The edge can be further refined based on the texture data by determining points in the mesh which correspond to peak gradients in the texture data.

Operation 652 includes identifying outlier vertices of a 3D mesh representation of a 3D space, at a common edge of adjacent planes of an object. Operation 654 includes fitting a mesh-based line to the outlier vertices. Operation 656 includes moving the outlier vertices to the mesh-based line. This movement can be perpendicular to the mesh-based line, for example. Operation 658 includes, for each of the moved outlier vertices, determining a corresponding set of pixels of the grayscale data, e.g., by ray casting from the outlier vertex to an image, a peak brightness gradient in the set of pixels, and a point in the mesh corresponding to a location of the peak brightness gradient e.g., by ray casting from the location to the mesh. Operation 660 includes fitting a texture-based line to the points in the mesh which correspond to the locations of the peak brightness gradients. Operation 662 includes moving the already-moved vertices from the mesh-based line to the texture-based line. Operation 664 includes measuring the object based on a length of the texture-based line, as this length is define in the mesh model.

The process can be repeated for different frames of depth and texture data to refine the texture-based line, as well as to define different edges of one or more objects. As described above with respect to method 300 (FIG. 3A), one or more operations may be omitted, such as operation 664, which may be substituted for some other useful action.

FIG. 7A depicts an example plot of brightness versus distance, consistent with the set of grayscale pixels 700 of FIG. 6A, operation 344 of the method of FIG. 3B, and the method of FIG. 6D, according to various embodiments. The vertical axis depicts brightness in a scale of 0 (black) to 100 (white) and the horizontal axis depicts a distance from the mesh-based line, e.g., perpendicular to the line. The pixels 700*a* and 700*b* have a brightness of 5, the pixel 700*c* has a brightness of 25, the pixels 700*d* and 700*e* have a brightness of 35, and the pixels 700*f* and 700*g* have a brightness of 40, in this example. As mentioned above, in other embodiments brightness may be represented by an 8-bit byte, giving a range of 0-255, or 256 possible shades. Still other embodiments may represent brightness using fewer or greater numbers of bits, depending upon the number of grayscale brightness levels are desired or needed for a given implementation.

Figure 7B:
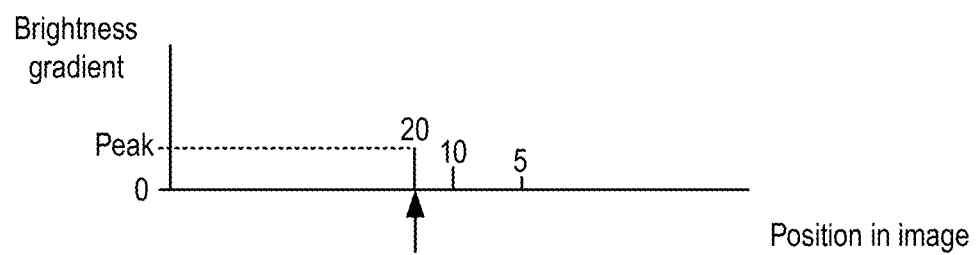
FIG. 7B depicts an example plot of brightness gradient versus position in an image, consistent with FIG. 7A and operation 344 of the method of FIG. 3B, according to various embodiments.

FIG. 7B depicts an example plot of brightness gradient versus position in an image, consistent with FIG. 7A and operation 344 of the method of FIG. 3B, according to various embodiments. The brightness gradient or difference is 20 between pixels 700*b* and 700*c*, 10 between pixels 700*c* and 700*d*, and 5 between pixels 700*e* and 700*f*. The peak gradient is therefore 20. As mentioned, the peak gradient can be determined for each of the outlier vertices of the mesh to refine the position of an edge of an object.

FIG. 8 depicts measurements of the object 404 in the 3D space 400 of FIG. 4, consistent with operation 320 of the method of FIG. 3A, and the adjusted edge represented by the line 630 of FIG. 6B, according to various embodiments. As mentioned, in the view of the object 404, there are three edges which may be defined, including the top front edge 840, the top side edge, represented by the line 630, and the side edge 820. Other edges of the object may be detected as well from other images. Measurements can be made of the object including its length, width and height, the area of surfaces of the object, the volume of the object, and so forth. In this example, the height H is the length of the line 630, the width W is the length of the edge 840 and the depth D is the length of the edge 820. The example bounding box 810 is also depicted which the user can define to focus on a particular object in the scene for processing as described herein.

When the bounding box is defined, its boundaries can be projected into the 3D space and the image to define a region of the space which is of interest.

Figure 9:
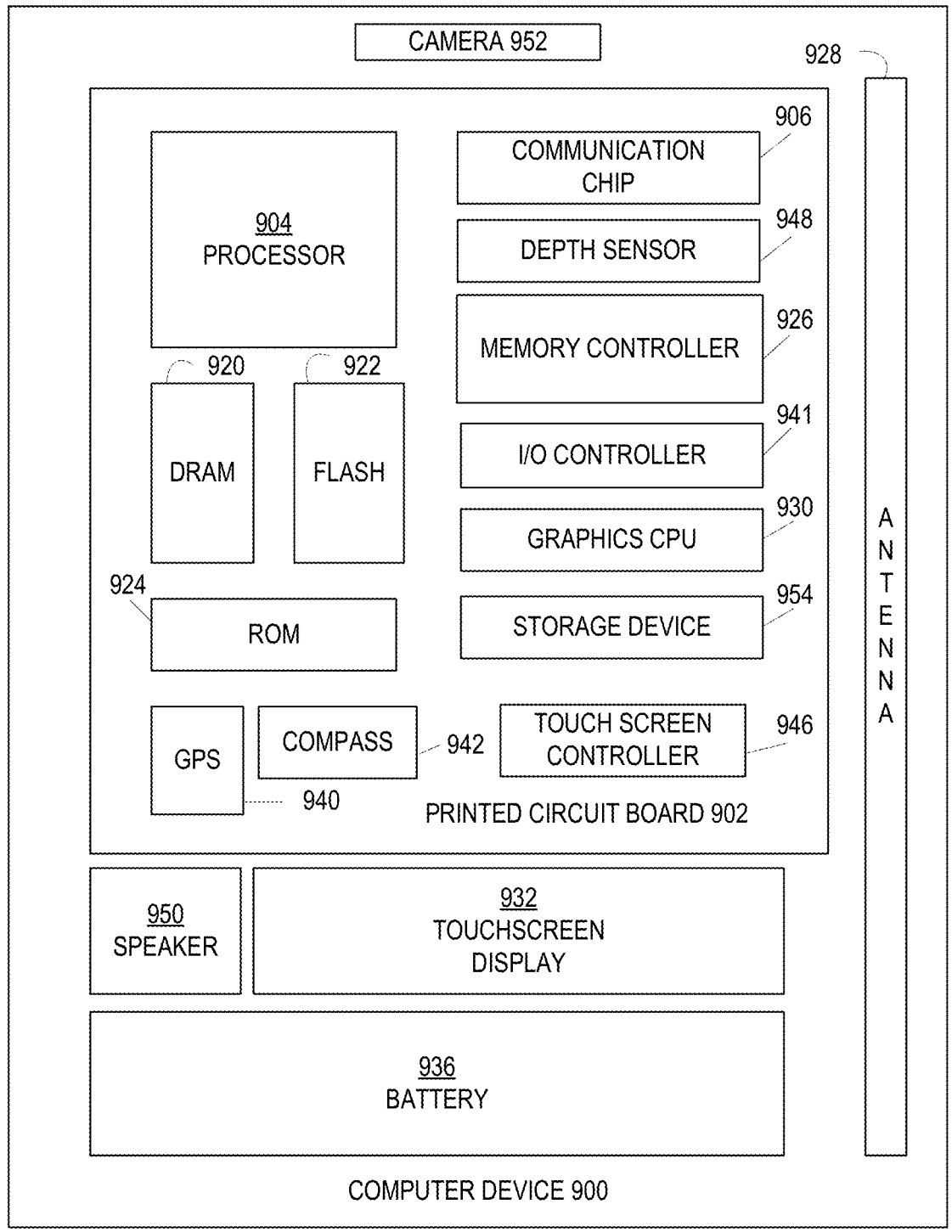
FIG. 9 is a block diagram of an example computer that can be used to implement some or all of the components of the disclosed systems and methods, according to various embodiments.

FIG. 9 illustrates an example computer device 900 that may be employed by the apparatuses and/or methods described herein, in accordance with various embodiments. As shown, computer device 900 may include a number of components, such as one or more processor(s) 904 (one shown) and at least one communication chip 906. In various embodiments, one or more processor(s) 904 each may include one or more processor cores. In various embodiments, the one or more processor(s) 904 may include hardware accelerators to complement the one or more processor cores. In various embodiments, the at least one communication chip 906 may be physically and electrically coupled to the one or more processor(s) 904. In further implementations, the communication chip 906 may be part of the one or more processor(s) 904. In various embodiments, computer device 1400 may include printed circuit board (PCB) 902. For these embodiments, the one or more processor(s) 904 and communication chip 906 may be disposed thereon. In alternate embodiments, the various components may be coupled without the employment of PCB 902.

Depending on its applications, computer device 900 may include other components that may be physically and electrically coupled to the PCB 902. These other components may include, but are not limited to, memory controller 926, volatile memory (e.g., dynamic random access memory (DRAM) 920), non-volatile memory such as read only memory (ROM) 924, flash memory 922, storage device 954 (e.g., a hard-disk drive (HDD)), an I/O controller 941, a digital signal processor (not shown), a crypto processor (not shown), a graphics processor 930, one or more antennae 928, a display, a touch screen display 932, a touch screen controller 1446, a battery 936, an audio codec (not shown), a video codec (not shown), a global positioning system (GPS) device 940, a compass 942, an accelerometer (not shown), a gyroscope (not shown), a depth sensor 948, a speaker 950, a camera 952, and a mass storage device (such as hard disk drive, a solid state drive, compact disk (CD), digital versatile disk (DVD)) (not shown), and so forth.

In some embodiments, the one or more processor(s) 904, flash memory 922, and/or storage device 954 may include associated firmware (not shown) storing programming instructions configured to enable computer device 900, in response to execution of the programming instructions by one or more processor(s) 904, to practice all or selected aspects of process flow 200 or methods 300 and 340 as described herein. In various embodiments, these aspects may additionally or alternatively be implemented using hardware separate from the one or more processor(s) 904, flash memory 922, or storage device 954.

The communication chips 906 may enable wired and/or wireless communications for the transfer of data to and from the computer device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 900 may include a plurality of communication chips 906. For instance, a first communication chip 906 may be dedicated to shorter range wireless communications such as Wi-Fi and Bluetooth, and a second communication chip 906 may be dedicated to longer range wireless communications such as GPS, EDGE, GPRS, CDMA, WiMAX, LTE, Ev-DO, and others.

In various implementations, the computer device 900 may be a laptop, a netbook, a notebook, an ultrabook, a smartphone, a computer tablet, a personal digital assistant (PDA), a desktop computer, smart glasses, or a server. In further implementations, the computer device 900 may be any other electronic device or circuit that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 10 illustrates an example computer-readable non-transitory storage medium that may be suitable for use to store instructions that cause an apparatus, e.g., a processor or other circuit, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., computer 900, in response to execution of the programming instructions, to implement (aspects of) process flow 200 and methods 300 and 340 as described above. In alternate embodiments, programming instructions 1004 may be disposed on multiple computer-readable non-transitory storage media 1002 instead. In still other embodiments, programming instructions 1004 may be disposed on computer-readable transitory storage media 1002, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
receiving, from a capturing device, one or more frames of depth data and color data of an object;
converting the color data to grayscale data;
generating, from the depth data, a 3D mesh representation of a 3D space, wherein the 3D mesh representation comprises vertices which define triangular surfaces of the 3D mesh representation, and the mesh representation comprises adjacent planes of an object;
identifying triangular surfaces in the 3D mesh representation, wherein for each triangular surface, two vertices are in one of the adjacent planes and an outlier vertex is in another of the adjacent planes;
determining a mesh-based line which represents a common edge of the adjacent planes based on the outlier vertices;
determining a texture-based line which represents the common edge based on the grayscale data; and
determining a final line which represents the common edge based on one or both of the mesh-based line and the texture-based line;
wherein the texture-based line is obtained by determining, for each of the outlier vertices, after the outlier vertex is moved to the mesh-based line, a corresponding set of pixels of the grayscale data, and determining a peak brightness gradient in the set of pixels, and wherein peak brightness gradients which are below a specified magnitude do not contribute to the texture-based line.

2. The method of claim 1, wherein the texture-based line is obtained by determining, for each of the outlier vertices, a point in the mesh corresponding to a location of the peak brightness gradient in the set of pixels.

3. The method of claim 1, wherein for each of the outlier vertices, the set of pixels corresponds to points in a predetermined range of distances in the 3D space, centered about the outlier vertex.

4. The method of claim 1, wherein for each of the outlier vertices, the set of pixels is determined by identifying an initial pixel which corresponds to the outlier vertex, after the outlier vertex is moved to the mesh-based line, and identifying adjacent pixels of the initial pixel, on both sides of the initial pixel.

5. The method of claim 4, wherein the adjacent pixels extend in a path which corresponds to a perpendicular path of the mesh-based line.

6. The method of claim 1, further comprising obtaining a measurement of the object based on a length of the final line.

7. The method of claim 1, wherein the mesh-based line is determined by fitting a straight line to the outlier vertices.

8. The method of claim 1, wherein the final line comprises a line which is midway between the mesh-based line and the texture-based line.

9. The method of claim 1, wherein the final line comprises the texture-based line.

10. The method of claim 1, wherein the final line represents the common edge based on both the mesh-based line and the texture-based line.

11. A non-transitory computer readable medium (NT-CRM) comprising instructions that, when executed by an apparatus, cause the apparatus to:
receive, from a capturing device, one or more frames of depth data and texture data of an object;
generate, from the depth data, a 3D mesh representation of a 3D space, wherein the 3D mesh representation comprises vertices which define triangular surfaces of the 3D mesh representation;
identify respective planes which represents respective surfaces of the object based on respective portions of the vertices whose locations are consistent with respective equations of the respective planes;
identify adjacent planes among the respective planes;
identify triangular surfaces in the 3D mesh representation which span a common edge of the adjacent planes, wherein for each triangular surface, two vertices are in one of the adjacent planes and an outlier vertex is in another of the adjacent planes;
determine a mesh-based line which represents a common edge of the adjacent planes based on the identified triangular surfaces;

move a plurality of vertices of the identified triangular surfaces to the mesh-based line; and determine, from the texture data and the moved plurality of vertices, a texture-based line which represents the common edge, wherein for each of the outlier vertices, the texture-based line is determined by identifying an initial pixel which corresponds to the outlier vertex, after the outlier vertex is moved to the mesh-based line, and identifying adjacent pixels of the initial pixel, on both sides of the initial pixel.

12. The NTCRM of claim 11, wherein the instructions, when executed by the apparatus, further cause the apparatus to:

move the plurality of vertices of the identified triangular surfaces from the mesh-based line to the texture-based line, and measure the object based on the plurality of vertices as moved to the texture-based line.

13. The NTCRM of claim 11, wherein to determine the texture-based line, the instructions, when executed by the apparatus, cause the apparatus to:

ray trace each moved vertex of the plurality of vertices to a respective initial pixel in the one or more frames, determine a location of a peak brightness gradient in a set of pixels which includes the initial pixel, and ray trace from the location of the peak brightness gradient to a point in the 3D mesh representation.

14. The NTCRM of claim 13, wherein the set of pixels comprise grayscale data.

15. The NTCRM of claim 13, wherein the set of pixels is centered about the initial pixel.

16. The NTCRM of claim 11, wherein the respective equations of the respective planes each have a format: ax+by+cz=d, where x, y and z are Cartesian coordinates and a, b, c and d are constants.

17. The NTCRM of claim 11, wherein for each of the identified triangular surfaces, two vertices are in one of the adjacent planes and an outlier vertex is in another of the adjacent planes, the plurality of vertices which are moved are the outlier vertexes, and the moving of the plurality of vertices is perpendicular to the mesh-based line.

18. A system, comprising:
a processor; and
a storage device in communication with the processor, wherein the storage device includes instructions that, when executed by the processor, cause the processor to:
receive, from a capturing device, one or more frames of depth data and color data;
convert the color data to grayscale data;
generate, from the depth data, a 3D mesh representation of an object in a 3D space, wherein the 3D mesh representation comprises vertices which define triangular surfaces of the 3D mesh representation, and the mesh representation comprises adjacent planes of the object;
identifying triangular surfaces in the 3D mesh representation having two vertices in one of the adjacent planes and an outlier vertex in another of the adjacent planes;
fit a line to the outlier vertices to provide a mesh-based line;
move the outlier vertices to the mesh-based line;
for each of the moved outlier vertices, determining a corresponding set of pixels of the grayscale data, a peak brightness gradient in the set of pixels, and a point in the mesh corresponding to a location of the peak brightness gradient in the set of pixels;
fitting a texture-based line to the points in the mesh; and
measuring the object based on a length of the texture-based line, wherein for each of the moved outlier vertices, the set of pixels is determined by identifying an initial pixel which corresponds to the moved outlier vertex, and identifying adjacent pixels of the initial pixel, on both sides of the initial pixel.

19. The system of claim 18, wherein the instructions, when executed by the processor, cause the processor to move the outlier vertices from the mesh-based line to the texture-based line.

20. The system of claim 18, wherein the adjacent pixels extend in a path which corresponds to a perpendicular path of the mesh-based line.

* * * * *